(No Model.) 2 Sheets—Sheet 1.
M. J. GRIER.
SLACK ADJUSTING DEVICE FOR BRAKE MECHANISMS.
No. 518,919. Patented Apr. 24, 1894.
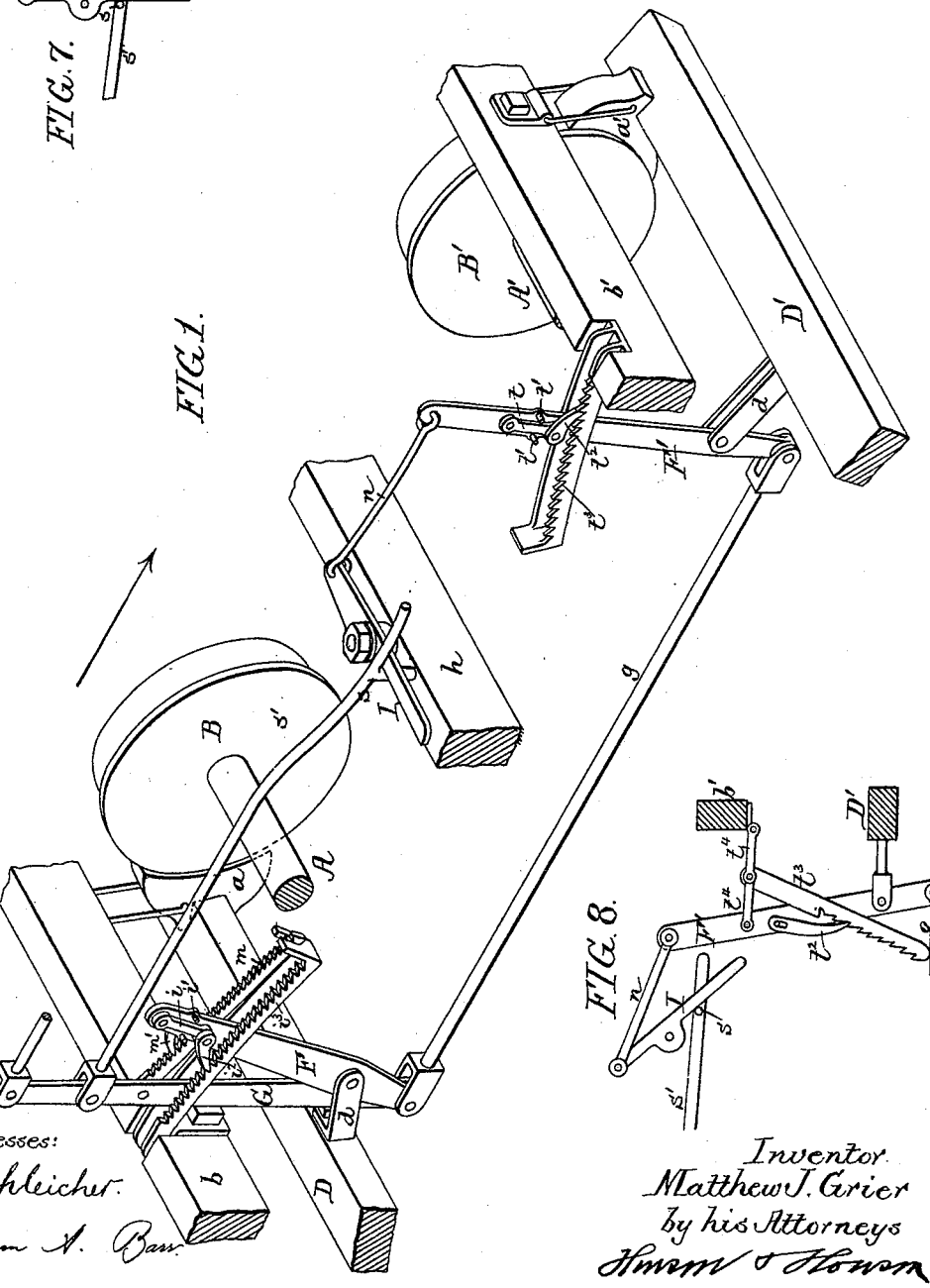
Witnesses:
R. Schleicher.
William A. Bau.
Inventor
Matthew J. Grier
by his Attorneys

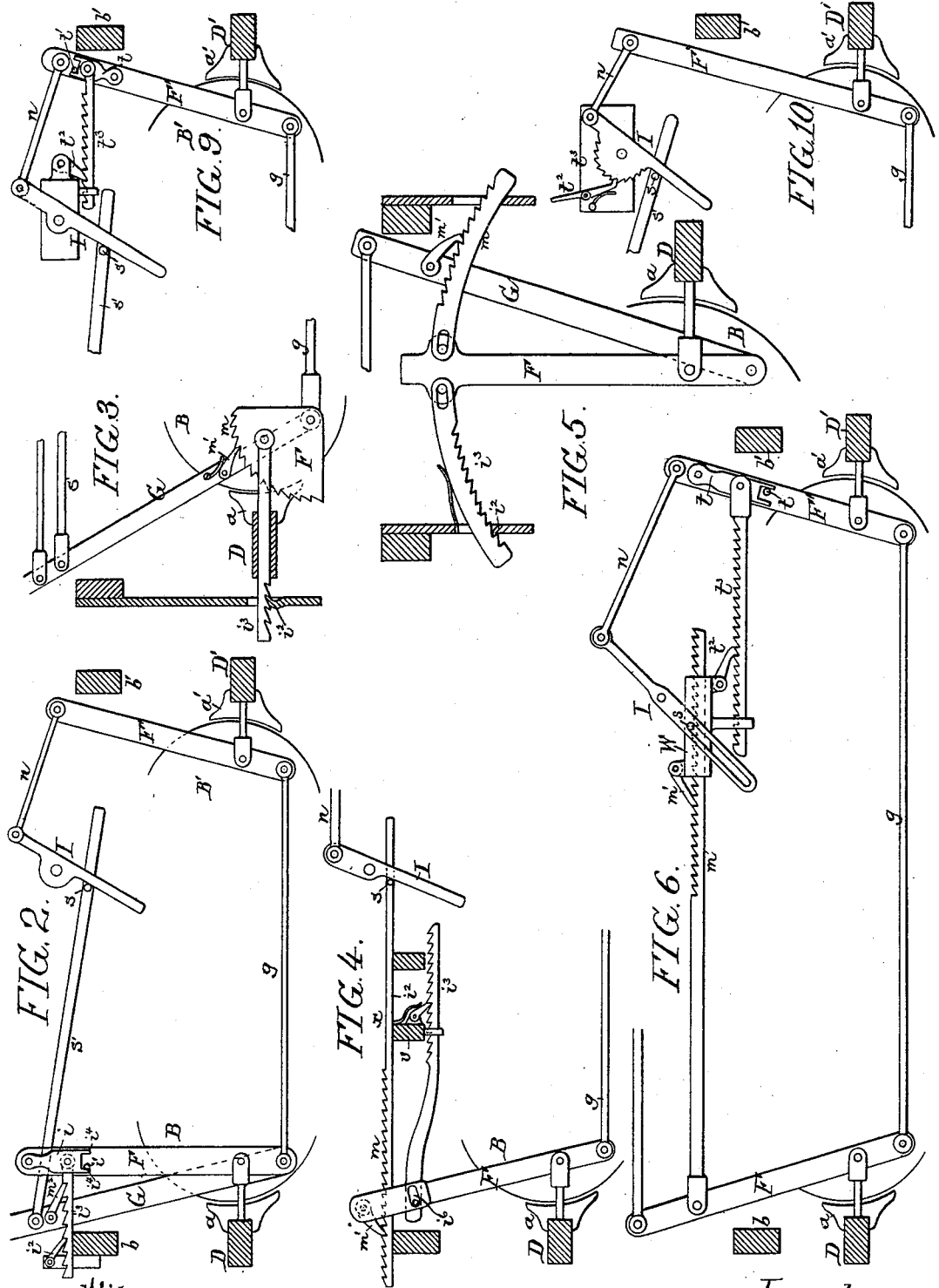

UNITED STATES PATENT OFFICE.

MATTHEW J. GRIER, OF PHILADELPHIA, PENNSYLVANIA, ASSIGNOR OF ONE-FOURTH TO J. WARREN COULSTON, OF SAME PLACE.

SLACK-ADJUSTING DEVICE FOR BRAKE MECHANISM.

SPECIFICATION forming part of Letters Patent No. 518,919, dated April 24, 1894.

Application filed August 1, 1893. Serial No. 482,083. (No model.)

*To all whom it may concern:*

Be it known that I, MATTHEW J. GRIER, a citizen of the United States, residing in Philadelphia, Pennsylvania, have invented certain Improvements in Compensating Devices for Railway-Car-Brake Mechanism, of which the following is a specification.

The object of my invention is to provide means whereby the slack in the braking gear, due either to wearing of the brake shoes or to looseness of fit or stretch of any part of the brake gear, will be automatically taken up by the operation of applying the brakes, the brake shoes being thus maintained at a normal predetermined distance from the wheels when the brakes are off, so that the application of the brakes can be effected with a uniform and minimum amount of travel of the piston in the brake applying cylinder or of the hand brake apparatus.

In carrying out my invention either the "live" lever or the "dead" lever of the usual brake gear may constitute the compensating lever or the compensation may be effected by both of said levers, the piston rod, draft chain, or other brake operating device being caused to effect movement of said compensating lever when it travels in one direction, but being free to travel in the opposite direction without imparting any movement to such compensating lever and the latter being held in its successive positions of advancement by means of a suitable retainer with which it is so connected that it is free to move to a limited extent independently thereof, in order to provide for the dropping of the shoes clear of the wheels when the pressure is removed from the brake applying devices.

In the accompanying drawings:—Figure 1, is a perspective diagram illustrating braking mechanism constructed in accordance with my invention and having compensating devices applied to both the live and dead levers of said mechanism. Figs. 2, 3, 4 and 5, are diagrammatic views illustrating various modified forms of compensating devices in accordance with my invention as employed in connection with the live lever only. Figs. 6, 7, 8, 9 and 10, are views of other modified constructions of the compensating device as employed in connection with the dead lever only.

In Fig. 1, A A' represent two axles of a car and B B' wheels carried by said axles, D D' representing two brake beams, one of which carries a shoe $a$ for application to the wheel B, while the other carries a shoe $a'$ for application to the wheel B', the brake beams being hung to stationary beams $b\ b'$, of the car frame in the usual manner, so that when no force is exerted to move the shoes into contact with the peripheries of the wheels said shoes will fall clear of the wheels, such movement being, if desired, assisted by any suitable arrangement of springs.

To an arm $d$ projecting from the brake beam D is hung the live lever F of the brake gear and to an arm $d'$ projecting from the brake beam D' is hung the dead lever F', the lower ends of these levers being connected by a rod $g$ in the usual manner. To the upper end of the lever F is hung an arm $i$ which is free to play a limited extent between pins or projections $i'$ on the lever, said pivoted arm $i$ carrying, at its lower end, a pawl $i^2$ which engages with a rack $i^3$ secured to and projecting from the beam $b$ of the car frame, said rack preferably forming one of the sides of a guide frame between which play the upper ends of the lever F and of a supplementary lever G, which is hung to the same pin which connects the lever F and rod $g$.

Hung to the lever G is a rack $m$ with which engages a pawl $m'$ pivoted to the upper end of the lever F, said rack $m$ having teeth facing in the same direction as those of the rack $i^3$. The upper end of the lever G is connected to the piston rod of the brake cylinder or to the draft chain of the hand brake apparatus and when it is drawn or pushed forward in the direction of the arrow it carries the lever F with it owing to the engagement of the rack $m$ and pawl $m'$ thus bringing the shoe $a$ into contact with the wheel B, and, if the dead lever is pivoted at its upper end in the usual manner, also causing the application of the shoe $a'$ to the wheel B' through the medium of the rod $g$. As the upper end of the lever F moves forward the pawl $i^2$ travels on the rack $i^3$, hence on the retraction of the lever G there is no corresponding retraction of the lever F, the rack $m$ being drawn under the pawl $m'$, while the rack $i^3$ holds the pawl $i^2$, the only backward movement of the lever F being that permitted by the play of the pivoted arm $i$ which carries said pawl $i^2$, this movement being simply sufficient to permit the brake shoes to drop clear of the wheels to the desired extent. It will therefore be seen that the abnormal slack in the braking mechanism is taken up on the first application of the brakes, or, if the slack is very great, on the first few operations of the brake mechanism, and thereafter only a very slight movement of the lever G and of the brake operating devices acting thereupon is permitted, each of the pawls advancing along the rack to the extent of a tooth at a time when the slack, due to the wear of the shoes or other causes, becomes sufficient to permit such advance.

In the construction shown in Fig. 1, I also provide for the positive operation of the dead lever F', so that, strictly speaking, the lever F' is not a dead lever but is a live lever in the sense that it is not dependent for its operation wholly upon the movement of the lever F, but has power applied to move it independently of the lever F. This is effected in the following manner: To a beam $h$ on the car frame is hung a lever I one arm of which is connected by a rod $n$ to the upper end of the lever F' while the other arm of said lever I is acted upon by a pin $s$ on a rod $s'$ connected to the lever G so that when the latter moves forward to actuate the lever F, movement in the contrary direction is imparted to the upper end of the lever F' and the brake shoe controlled thereby is brought into contact with the periphery of the wheel B'. To the upper end of the lever F' is hung an arm $t$ which plays between lugs or projections $t'$ on the lever and carries a pawl $t^2$ engaging with a fixed rack $t^3$ projecting from the beam $b'$, this construction being a duplicate of that provided in connection with the lever F and having the effect of retaining the upper end of the lever F' in the forward position to which it is drawn on the first application of the brakes, except for the limited amount of play provided by the swinging pawl-carrying arm $t$, the pin $s$ of the rod $s'$ acting on the lever I only on the forward movement of said rod, so that the upper end of the lever F' is permitted to retain the advanced position which it assumes, and this advance, as in the case of the lever F, being increased tooth by tooth as additional slack is formed by reason of wear or other causes.

As before stated, the compensating device may be used only in connection with the live lever or in connection with the dead lever, and many modifications in construction are possible within the scope of my invention, some of these modifications being illustrated in Figs. 2 to 10 of the drawings.

In the construction shown in Figs. 2, 3, 4 and 5, the compensating devices are used only in connection with the live lever.

In Fig. 2 the arm $i$ at the upper end of the lever F carries a rack $i^3$ instead of a pawl, the pawl $i^2$ for engaging with said rack being hung to a suitable bracket on the beam $b$. A pawl $m^2$ hung to the lever G also acts upon the rack $i^3$ so that said rack $i^3$ takes the place of both racks $m$ and $i^3$ of the device shown in Fig. 1. As movement in this case is imparted to the lever F through the medium of the arm $i$ the latter is constructed in a form substantially the reverse of the arm $i$ in Fig. 1, that is to say, the lower end of the arm has two projections $i^4$ into the space between which projects a single pin $i'$ on the lever F, so that while the arm may be rigidly held in any position of advancement by the rack $i^3$ and the pawl $i^2$, the lever F is free to yield in order to permit the shoe $a$ to drop clear of the wheel.

In the construction shown in Fig. 3, the lever F is in the form of a quadrant having a notched edge constituting the rack $m$ and the lever G carries a pawl $m'$ engaging with this rack, the rack $i^3$, in this case, forming a continuation of the rod which connects the lever F to the brake beam D and said rack engaging with a pawl tooth $i^2$ formed on a guide bar depending from the beam $b$. In this case the necessary play of the brake shoes is provided for by undercutting the teeth of the rack $i^3$ so that after each tooth of the rack passes the pawl tooth it can back off slightly in seating itself against said tooth.

In the construction shown in Fig. 4, the lever G is dispensed with and the operating rod $x$ of the braking device has a rack $m$ which acts directly upon a pawl $m'$ carried by the upper end of the lever F, so that said rod operates the lever F on the forward movement, but can be retracted without moving the lever. In this case, also the desired lost motion of the lever in respect to the rack bar $i^3$ is effected by means of a slot $i^6$ formed in the lever for the reception of the pin whereby said rack bar is hung to the lever, the retaining pawl $i^2$ in this case being hung to a special beam $v$ of the car frame and the lever I being acted upon by a pin $s$ projecting directly from the rod $x$.

In the construction shown in Fig. 5, both of the racks $i^3$ and $m$ are hung to the lever F and each of the racks is slotted to provide for lost motion, each rack being suitably guided in a depending bar on the frame work.

Figs. 6, 7, 8, 9 and 10 show compensating devices employed in connection with the dead lever.

In the construction shown in Fig. 6, the rack $m$ is hung directly to the live lever F and engages with a pawl $m'$ upon a block W which carries the pin $s$ for acting upon the lever I, this block also carrying a pawl $t^2$ for engaging with a rack $t^3$ which is hung to the pivoted arm $t$ of the lever F, said arm being constructed in the same manner as the arm $i$ of Fig. 2, in order to permit the desired play of the lever. When the rack $m$ is moved forward it operates the lever I and the latter in turn actuates the lever F', the rack $t^3$ and pawl $t^2$ holding the advance movement of said lever. On the retraction of the rack $m$ it slips under the pawl $m'$ without effecting any corresponding movement of the levers I or F', the block W being held by engagement of its pawl $t^2$ with the rack $t^3$.

In the construction shown in Figs. 7 and 8 the compensating device consists of a rack $t^3$ hung to a pair of toggle arms $t^4$ one of which is connected to the lever F' and the other to a fixed beam $b'$ of the frame, the pawl $t^2$ engaging with the rack $t^3$ and having a lost motion connection with the lever F'. When the shoes swing free the toggle is raised as shown in Fig. 7, but as the upper end of the lever is drawn forward the toggle is straightened and the rack $i^3$ is thrust downward, any excessive movement being held by the pawl, which, however, is free to yield in order to provide for the slackening of the shoe.

The construction of retaining rack and pawl shown in Fig. 9, is substantially similar to that shown in Fig. 6 with the exception that the pawl is hung to the fixed beam on which the lever I is pivoted, the movement of said lever being effected by means of a pin $s$ and rod $s'$ instead of by a rack bar acting upon a movable block.

In the construction shown in Fig. 10, the compensating device is formed upon the lever I, a segmental rack $t^3$ on said lever engaging with a pawl $t^2$ mounted upon the beam to which the lever is pivoted.

It should be understood that the lever I is shown in vertical position in Figs. 2, 4, 6, 7, 8, 9 and 10, in order to simplify and render more readily intelligible the diagrammatic representations of braking mechanism forming the subjects of said figures, but that in practice said lever would occupy a horizontal position, in most cases, as shown in Fig. 1.

Having thus described my invention, I claim and desire to secure by Letters Patent—

1. The combination, in compensating devices for car brake mechanism, of the compensating lever, an actuating device therefor which moves the lever in one direction, but has no control over its movement in the opposite direction, a retainer for holding that portion of the movement of the compensating lever which is due to slack in the brake gear, and a lost motion connection between said retainer and the compensating lever to permit of a limited independent movement of the latter in order to free the brake shoes from contact with the wheels, substantially as specified.

2. The combination in compensating devices for car brake mechanism, of the compensating lever, an operating device having a ratchet and pawl connection with said compensating lever whereby provision is afforded for advancing the end of the compensating lever in respect to said operating device, a retainer for holding the lever in such advanced position, and a lost motion connection between said retainer and the lever, substantially as specified.

3. The combination in compensating devices for car brake mechanism of the compensating lever, a supplementary lever connected to the brake operating mechanism, and having a pawl and ratchet connection with said compensating lever, a retainer for holding the compensating lever in successive positions of advancement, and a lost motion connection between said retainer and the compensating lever, substantially as specified.

4. The combination of the two brake shoe operating levers, of a car truck, an interposed lever connected to one of said brake shoe operating levers, a brake operating device which, on its forward movement, acts both upon said interposed lever and upon one of the brake shoe operating levers, but on the reverse movement has no effect upon either of said levers, and a lost motion retainer for holding either or both of said brake operating levers in its advanced position, substantially as specified.

In testimony whereof I have signed my name to this specification in the presence of two subscribing witnesses.

MATTHEW J. GRIER.

Witnesses:
WILLIAM A. BARR,
JOSEPH H. KLEIN.